Oct. 27, 1970   A. G. TALBERT   3,536,340
HINGED ASSEMBLY FOR COUPLING TRACTOR AND TRAILER
Filed May 1, 1968   4 Sheets-Sheet 1
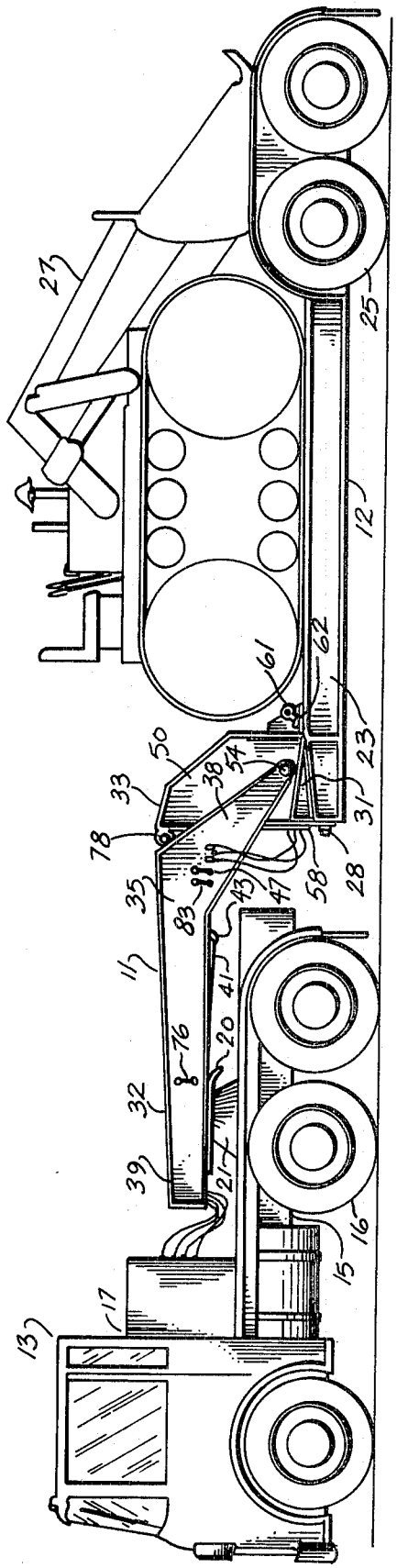
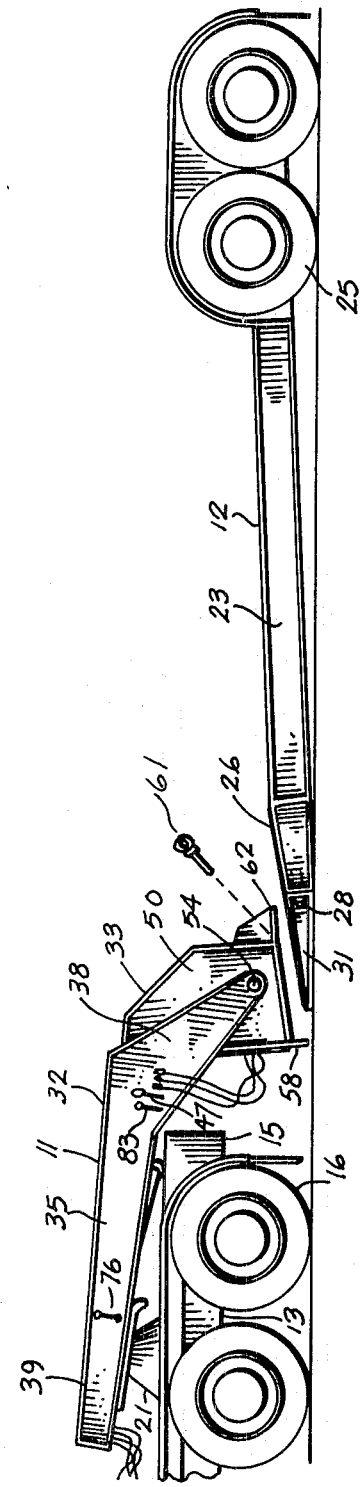
INVENTOR.
AUSTIN G. TALBERT
BY *John R. Nesbitt*
ATTORNEY Oct. 27, 1970 A. G. TALBERT 3,536,340
HINGED ASSEMBLY FOR COUPLING TRACTOR AND TRAILER
Filed May 1, 1968 4 Sheets-Sheet 2

INVENTOR.
AUSTIN G. TALBERT
BY *John R. Nesbitt*
ATTORNEY

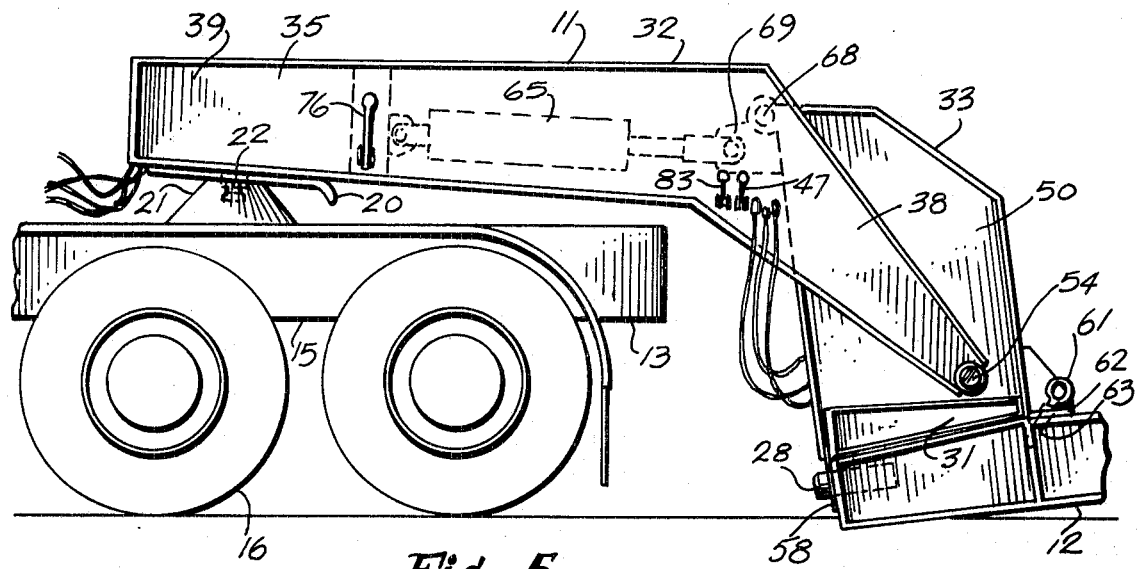
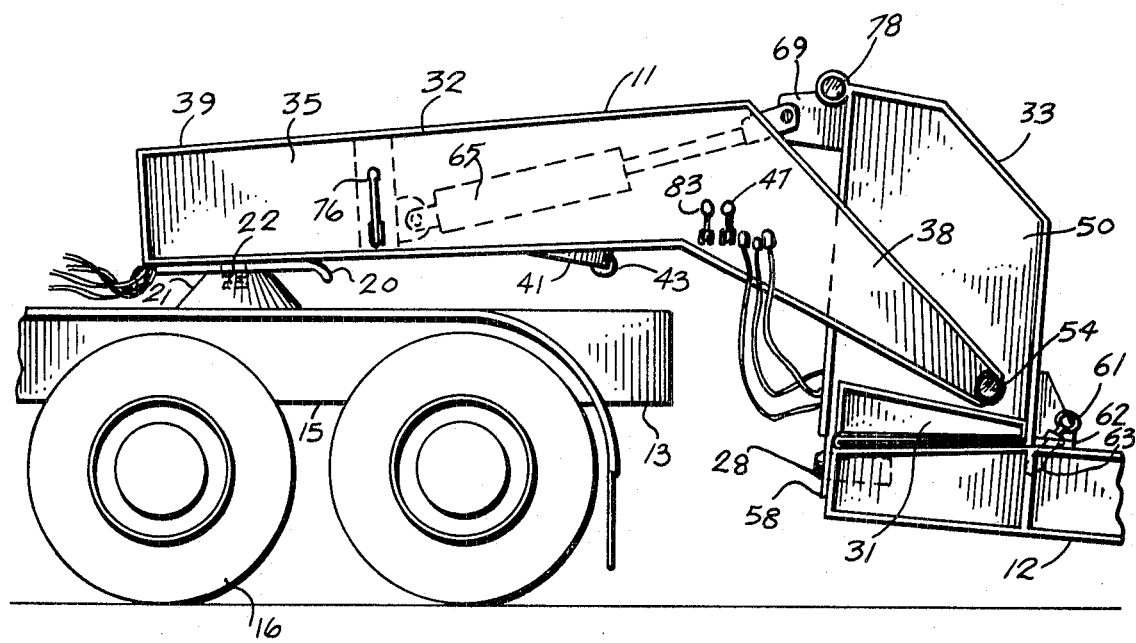

Oct. 27, 1970      A. G. TALBERT      3,536,340
HINGED ASSEMBLY FOR COUPLING TRACTOR AND TRAILER
Filed May 1, 1968      4 Sheets-Sheet 4
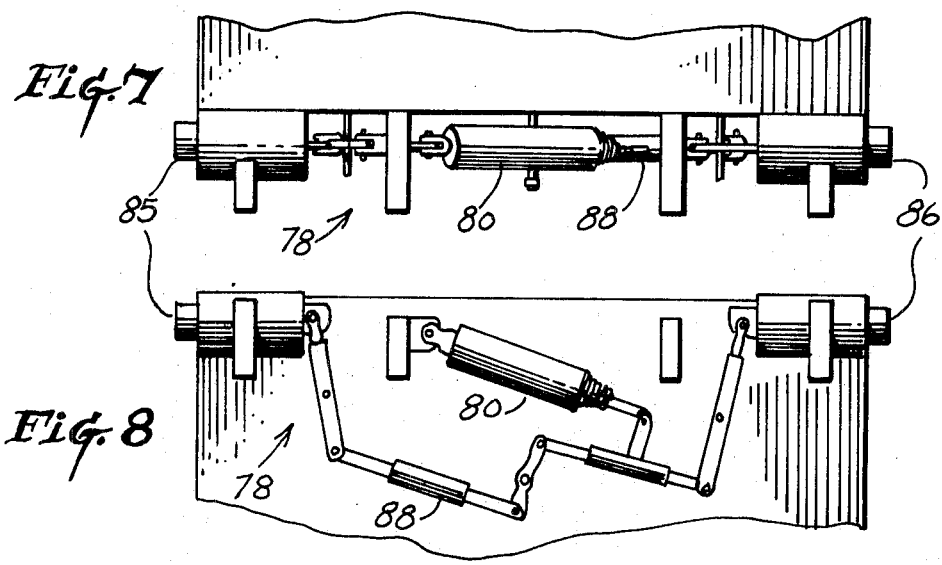
Fig. 7
Fig. 8
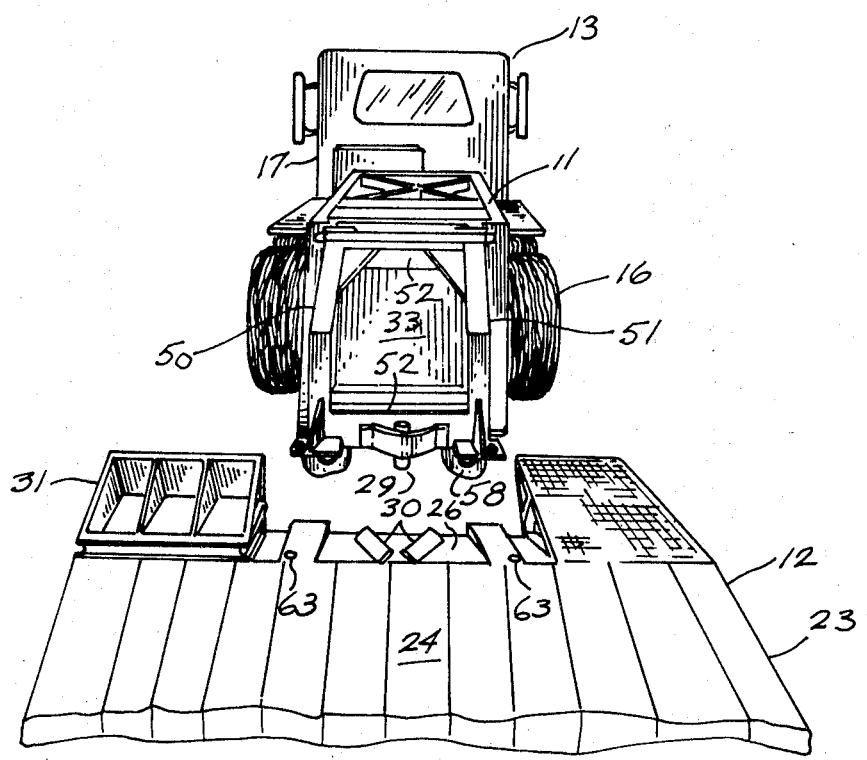
Fig. 9
INVENTOR.
AUSTIN G. TALBERT
BY John R. Nesbitt
ATTORNEY

United States Patent Office 3,536,340
Patented Oct. 27, 1970

3,536,340
HINGED ASSEMBLY FOR COUPLING TRACTOR AND TRAILER
Austin G. Talbert, Downers Grove, Ill., assignor to Talbert Manufacturing, Inc.
Filed May 1, 1968, Ser. No. 725,844
Int. Cl. B62d 53/06
U.S. Cl. 280—425                                     7 Claims

ABSTRACT OF THE DISCLOSURE

A hinged assembly for connecting a trailer of the low-bed type to a tractor. The assembly includes a draft member, one end of which engages a fifth wheel positioned above the frame of the tractor and the other end of which extends downwardly and rearwardly of the tractor frame and has a base member pivoted thereon with the bottom portion of said base member being detachably engagable with the sloping forward end of the deck portion of the trailer. Pivotable movement of the base member, which in conjunction with pivoting of the draft member about the fifth wheel effects vertical movement of the forward end of a trailer attached to the base member, is effected by an actuator connected between the draft member and the base member at a point on the base member above the pivot point thereof. The assembly also includes releasable safety locking means connected between the draft member and the base member to preclude relative movement therebetween until the safety locking means has been released, as well as support means connected to the draft member and engageable with the rearwardly extending frame of the tractor to preclude downward movement of the draft member when the support means is in engagement with the tractor frame, the thus provided support for the hinged frame assembly being particularly useful after a trailer has been disconnected from the assembly.

BACKGROUND OF THE INVENTION

Field of the invention

This invention relates to a hinged frame assembly and more particularly relates to an assembly for connecting a trailer of the low-bed type to a tractor.

DESCRIPTION OF THE PRIOR ART

Tractor and low-bed trailer units have heretofore been known and utilized, particularly for transporting heavy equipment such as cranes, power shovels, and tractors, for example, from one location to another. The commonly utilized type of low-bed trailer that has gained wide acceptance for this purpose is attached to the tractor by means of a gooseneck which is detached from the front end of the trailer, commonly after lowering of the trailer front end into ground engagement, to thereafter enable front end loading and unloading of the heavy equipment onto and from the flat deck of the trailer. Tractor and low-bed trailer units of this general type are shown, for example, in U.S. Pats. Nos. 2,489,112, 3,041,087, and 3,215,449, all of which were issued to me.

While tractor and low-bed type trailer units heretofore known and utilized have generally proved to be of value for commercial usage, and while some such units include improved goosenecks that have gone far toward solving many of the more difficult problems, it was felt that further simplification of the connecting assembly which would result particularly in further space saving and lighter units was desirable. To achieve this end, it was further felt that such a connecting assembly could best be attained through invention of a hinged frame assembly based generally upon the teachings in my U.S. Pat. No. 3,231,309 directed to a "Dump Trailer."

SUMMARY OF THE INVENTION

This invention provides a hinged frame assembly for connecting a trailer of the low-bed type to a tractor, which assembly is simple in construction and dependable, yet is more compact and lighter in weight than assemblies of this type heretofore commonly utilized.

It is therefore an object of this invention to provide a hinged frame assembly that is particularly well suited for connecting a trailer of the low-bed type to a tractor.

It is another object of this invention to provide a hinged frame assembly that is simple yet dependable, and is of compact size and of relatively light weight.

It is still another object of this invention to provide a hinged frame assembly having a draft member one end of which is connected to a pivotable fifth wheel of a tractor and the other end of which has a base member pivotably connected thereto so that actuation of an actuator connected between the draft member and base member at a point on the base member above the first point effects raising or lowering of the front end of a low-bed trailer attached to the bottom of the base member.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof and in which:

FIG. 1 is a side elevation view of a tractor and trailer unit of the low-bed type with the hinged frame connecting assembly of this invention in the preferred transporting position;

FIG. 4 is a side elevation view showing the hinged frame assembly of this invention in a raised position wherein the front end of an attached trailer is raised above the normal transporting position;

FIG. 5 is a side elevation view of the hinged frame assembly of this invention in a lowered position wherein the front end of an attached trailer is permitted to engage the ground;

FIG. 6 is a side elevation view showing the trailer with the hinged frame assembly of this invention attached thereto after detachment and movement of said assembly out of engagement with the front end of the trailer;

FIG. 7 is a partial top view showing the safety lock means for precluding movement between the draft member and base member when in locked position;

FIG. 8 is a partial end view showing the safety lock means of FIG. 7; and

FIG. 9 is a rear end view of the trailer and hinged frame assembly with the tractor pulled a short distance away from the trailer.

DESCRIPTION OF THE PREFERRED EMBODIMENT

Figure 3:
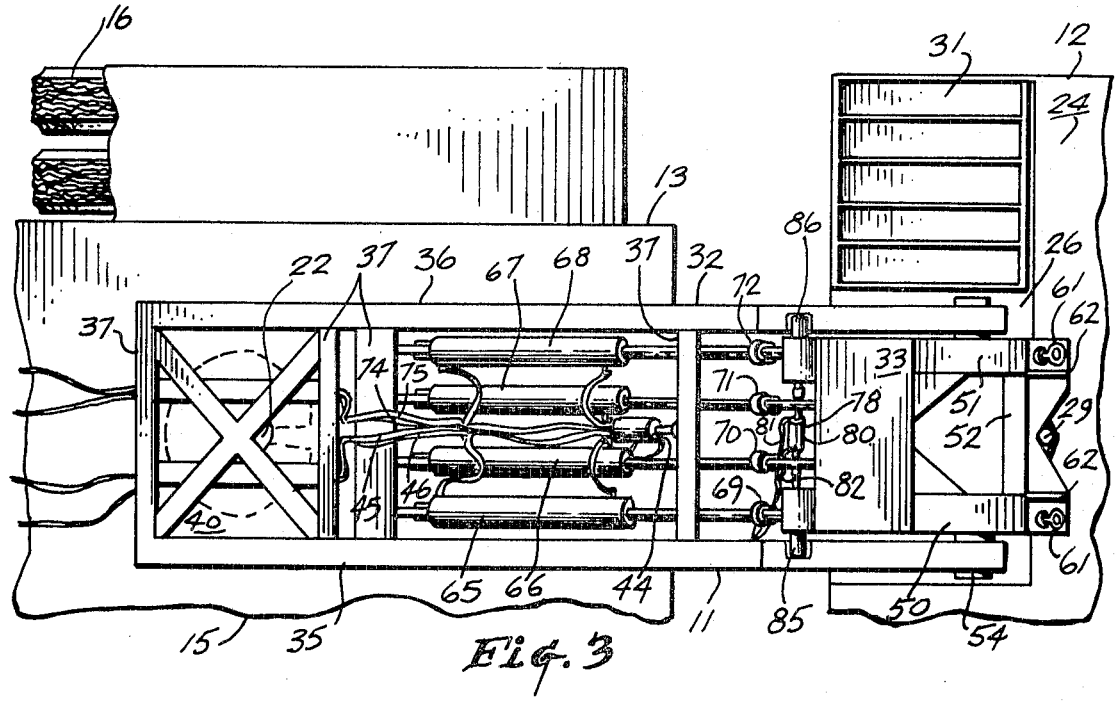
FIG. 3 is a partial top elevation view illustrating the hinged frame assembly shown in FIG. 2.

Referring now to the drawings, the numeral 11 refers generally to the hinged frame assembly of this invention which, as shown in FIG. 1, is utilized in connecting a low-bed type trailer 12 to a tractor 13.

Tractor 13 may be conventional and includes a frame 15, wheels 16, and a cab 17. Frame 15 has a fifth wheel 20 supported on trunnions 21 rearwardly of the cab so that the fifth wheel can pivot about a horizontal axis extending transversely of the tractor, as is conventional. As is well known in the art, fifth wheel 20 has an opening (see FIG. 3) therein to receive a king pin 22 which is locked in position by a conventional locking mechanism (not shown).

Trailer 12 has an elongated low body 23 with a flat horizontal deck 24 and wheels 25 at the rear. The front edge 26 of the deck of the trailer slopes forwardly and downwardly. Since the heavy equipment (designated by the numeral 27) is commonly loaded from the front of the trailer while the front engages the ground, this sloping portion is obviously advantageous for loading and unloading of the heavy equipment. In addition, a pair of protruding pins 28 extend forwardly from the front of the trailer below the deck, while a guide pin 29 on the hinged frame assembly is received between guides 30 to assist in proper positioning of the hinged assembly at the front of the trailer.

As shown best in FIGS. 6 and 9, folding ramps 31 are also provided to assist in front end loading and unloading of the trailer, the folding ramps being spaced so that the hinged assembly is received therebetween when attached to the front of the trailer. If desired, a mat (not shown) can extend across the ramps when folded into loading position as shown in FIG. 6.

Hinged frame assembly 11, which could be described as a hinged frame gooseneck, includes a draft member 32 and a base member 33. Draft member 32, as shown best in FIG. 3, has a pair of longitudinally extending, laterally spaced part side members 35 and 36 held in spaced relationship as by means of space member 37. As shown in FIGS. 1, 2, and 4 through 6, the rear portion 38 of sides 35 and 36 extends downwardly and rearwardly with respect to the front portion 39 at about a 45° angle.

A flat plate 40, connected to the bottom of member 37, has a king pin 22 depending therefrom. King pin 22, as brought out hereinabove is received in the opening of conventional fifth wheel 20 of tractor 13.

Figure 2:
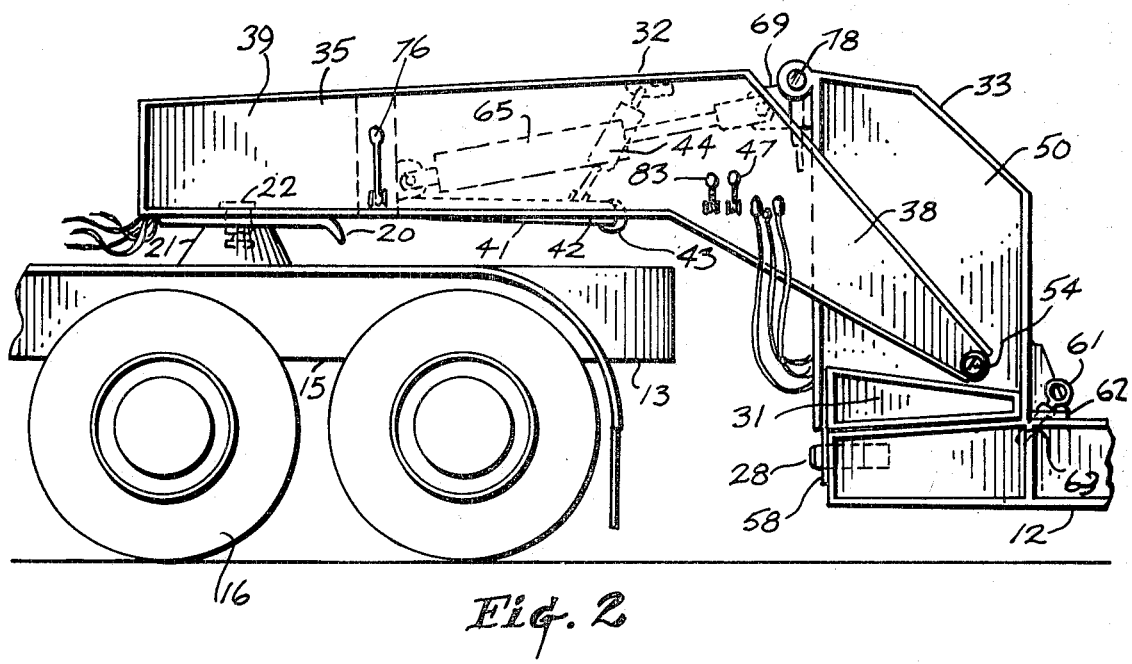
FIG. 2 is the side elevation view of a portion of the trailer and tractor unit shown in FIG. 1 showing the hinged frame assembly in greater detail.

As shown best in FIG. 2, a movable support 41 includes an arm 42 pivoted on member 37 at one end and having a generally cylindrically shaped bumper 43 at the other end, which bumper is engageable with the extended rear portion of the frame 15 of tractor 13 rearwardly of the fifth wheel. As also shown in FIG. 2, arm 42 is pivotal so that bumper 43 is either raised or lowered as desired by a hydraulic cylinder 44 connected to the hydraulic unit by lines 45 and 46 with actuation being controlled by lever 47 at the pneumatic unit. When arm 42 is lowered so that bumper 43 engages the frame 15 of tractor 13, support 41 prevents draft member 32 from being lowered. This support is utilized for support of the hinged assembly during and after the hinged assembly is disengaged from a trailer. When utilized, the hinged assembly can be raised or lowered by actuation of lever 47 which, in turn, actuates the pneumatic unit 44.

Base member 33 has a pair of side members 50 and 51 held spaced apart as by plates 52. As shown best in FIG. 3, base member 33 is received between the sides 35 and 36 of draft member 32. Base member 33 is pivoted at the lower end of the rear portion 38 of each side of the draft member by means of a pivot rod 54 so that the base member will pivot about a horizontal axis transverse to the draft member.

The bottom edge of the base member slopes downwardly and forwardly to match the slope of the front edge of the deck of a trailer and has guide pin 29 extending therefrom to be received in guides 30 in the sloping front edge of the trailer. At the front lower edge of the base member, plates 58 extend below the bottom edge of the base member, each of which plates has an aperture therein of a diameter and spaced to receive the protruding pins 28 extending forwardly from the trailer when the front end of the trailer is brought into engagement with the bottom of the base member and contiguous to plates 58. Retaining pins 61 are also provided at the rear of the base member, which pins extend through plate 62 attached to the base member and into recesses 63 in the deck to retain the trailer in engagement with the base member.

Four actuators (hydraulic cylinders) 65, 66, 67, and 68, are also provided between the forward portion of draft member 32 and ears 69, 70, 71, and 72, at the top front edge of base member 33. As is conventional, cylinders 65–68 are connected to the hydraulic unit by means of lines 74 and 75 and actuation of the pistons is controlled by lever 76.

A safety lock 78 is also provided to preclude movement of the base member relative to the draft member when in locked position. As shown in FIGS. 3, 7, and 8, safety lock 78 includes a cylinder 80 having air lines 81 and 82 leading thereto with the cylinder being controlled by a lever 83. Cylinder 80 causes pins 85 and 86, which are slidably retained at opposite sides of the base member 33, to either be retracted to an unlocked position or extended into locked position with the pins then extending into recesses in the sides 35 and 36 of the draft member, the cylinder acting through a linkage system 88, as best shown in FIG. 8, so that when the piston is extended the pins are retracted to the unlocked position and extended to the locked position when the piston is retracted.

In operation, when the pistons are extended from cylinders 65–68, the upper portion of base member 33 is caused to be pivoted rearwardly about pivot rod 54 which causes the lower front edge of the base member to be raised, and in addition, causes draft member 32 to also be raised due to the pivotal connection of the draft member to the fifth wheel of the trailer, as shown in FIG. 4.

When the pistons are withdrawn into cylinders 65–68, the upper portion of the base member is caused to move forwardly toward draft member 32, which, of course, causes the front lower edge of the base member to be lowered, and, in addition, causes the draft member to be lowered due to the pivotal connection of the draft member to the fifth wheel. As shown in FIG. 5, this motion lowers the first edge of the trailer to the ground to release the bind between pins 28 and plates 58 and, after removal of retaining pin 61, the tractor is pulled forward to disengage the hinged frame assembly from the trailer as shown in FIG. 6.

In normal transporting position, as shown in FIGS. 1 and 2, the front portion of the draft member is substantially horizontal and the trailer is held with the deck also substantially horizontal by the hinged frame assembly. To assure that the front end of the trailer will not drop, as could occur, for example, by failure of cylinders 65–68, safety lock 80 is preferably in locked position. As brought out hereinabove, safety lock 80 must then be disengaged before the front end of the trailer can be lowered for loading or unloading purposes.

The device of this invention thus provides a hinged frame assembly for connecting low-bed trailers to a tractor that is simple yet dependable.

What I claim is:

1. A hinged assembly for connecting a trailer of the low-bed type to a tractor, said assembly comprising: a draft member having an elongated front portion adapted for engagement with a fifth wheel of a tractor and a rear portion extending downwardly from and with respect to said front portion for a substantial distance; a base member having a sloping bottom portion adapted for engagement with a like sloping front deck end of a low-bed trailer, said base member having an upper portion that is as substantially as great in height as the front portion of said draft member; pivot means connecting the end of said rear portion of said draft member with the lower rear portion of said base member so that said base member pivots about a substantially horizontal axis substantially transverse to said draft member; depending connector means extending from the lower front edge of said base member and adapted to be releasably engagable with cooperating means on the front of said trailer in a manner such that when so engaged the deck of said trailer is in engagement with the bottom portion of said base member; and actuating means directly connected between the front portion of said draft member and the upper front end of said base member whereby actuation of said actuation means in one direction causes pivotal movement of said base member in a direction to raise the end of said trailer connected to said base member and actuation of said actuation means in the opposite direction causes pivotal movement of said base member in a direction to lower the end of said trailer connected to said base member.

2. A hinged assembly for connecting a trailer of the low-bed type to a tractor, comprising: a draft member having a front portion and a rear portion extending downwardly with respect to said front portion; means near the front of said front portion of said draft member for adapting said draft member for engagement with the pivotable fifth wheel of a tractor; a base member having a bottom portion adapted for engagement with the deck of a low-bed trailer; pivot means for pivotally connecting said base member to the rear portion of said draft member so that said base member pivots about a substantially horizontal axis substantially transverse to said draft member; connecting means attached to said base member at the front thereof and adapted to be releasably engageable with cooperating means on the front of said trailer in a manner such that when so engaged the deck of said trailer is in engagement with the bottom portion of said base member; actuating means connected with said draft member and said base member to cause said base member to be pivoted about said pivot means to raise and lower the end of said trailer connected to said base member with respect to said draft member; and safety lock means connected between said draft member and the upper portion of said base member when in locked position to preclude said base member from pivoting about said draft member and the upper portion of said base member when in locked position to preclude said base member from pivoting about said draft member to prevent lowering of the connected end of said trailer.

3. The assembly of claim 2 further characterized by a guide pin on said base member extending from the bottom thereof to be received in guides at the front of the deck of the trailer to facilitate proper engagement of said base member with the front end of said trailer.

4. The assembly of claim 2 wherein foldable ramps are provided at the side edges of the front of said trailer, and wherein said base member is received therebetween when connected to said trailer.

5. A hinged assembly for connecting a trailer of the low-bed type to a tractor said assembly comprising: a draft member having a front portion adapted for engagement with a fifth wheel of a tractor and a rear portion extending downwardly a substantial distance and at about a 45° angle with respect to said front portion; a base member having a bottom portion adapted for engagement with the deck of a low-bed trailer; pivot means connected to the lower rear portion of said base member for pivotally connecting said base member to said draft member at the end of said rear portion of said draft member so that said base member pivots about a substantially horizontal axis substantially transverse to said draft member; connecting means attached to said base member at the front thereof and adapted to be releasably engageable with cooperating means on the front of said trailer in a manner such that when so engaged the deck of said trailer is in engagement with the bottom portion of said base member; and actuating means connected to said draft member and said base member above said pivot means whereby actuation of said actuating means in one direction causes pivotal movement of said base member in a direction to raise the end of said trailer connected to said base member and actuation of said actuation means in the opposite direction causes pivotal movement of said base member in a direction to lower the end of said trailer connected to said base member.

6. The hinged assembly of claim 5 wherein the bottom portion of said base member slopes downwardly from back to front to engage a like slope at the front of the deck of a trailer.

7. A hinged assembly for connecting a trailer of the low-bed type to a tractor said assembly comprising: a draft member having a front portion adapted for engagement with a fifth wheel of a tractor and a rear portion extending downwardly with respect to said front portion; a base member extending upwardly to a height substantially as great as the forward portion of said draft member having a bottom portion adapted for engagement with the deck of a low-bed trailer; pivot means for pivotally connecting said base member to the rear portion of said draft member so that said base member pivots about a substantially horizontal axis substantially transverse to said draft member; connecting means attached to said base member at the front thereof and adapted to be releasably engageable with cooperating means on the front of said trailer in a manner such that when so engaged the deck of said trailer is in engagement with the bottom portion of said base member; and actuating means directly connected between said forward portion of said draft member and the upper end of said base member above said pivot means whereby actuation of said actuating means in one direction causes pivotal movement of said base member in a direction to raise the end of said trailer connected to said base member and actuation of said actuation means in the opposite direction causes pivotal movement of said base member in a direction to lower the end of said trailer connected to said base member.

References Cited

UNITED STATES PATENTS 2,967,720    1/1961    Smith et al.
3,215,449    11/1965    Talbert.

LEO FRIAGLIA, Primary Examiner

U.S. Cl. X.R.
214—505